June 30, 1936.  M. M. OGEE  2,045,671
PIPE CONSTRUCTION
Filed Jan. 10, 1934
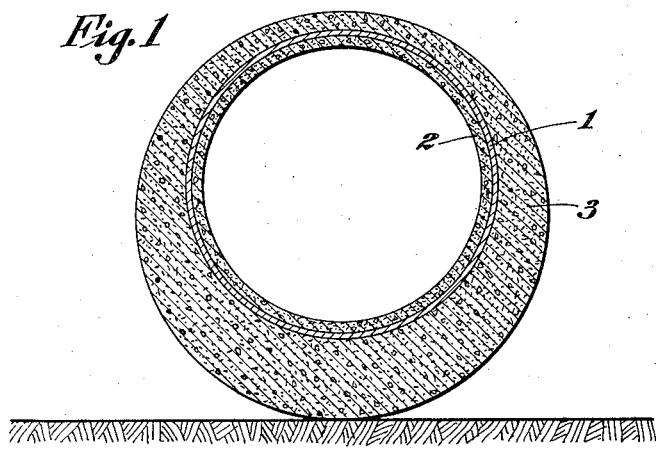
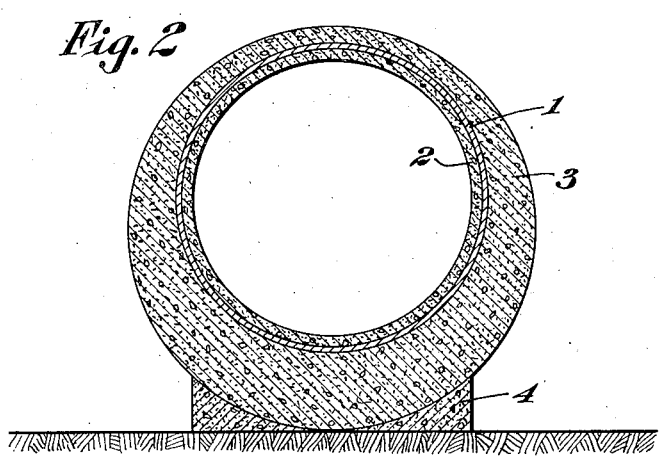
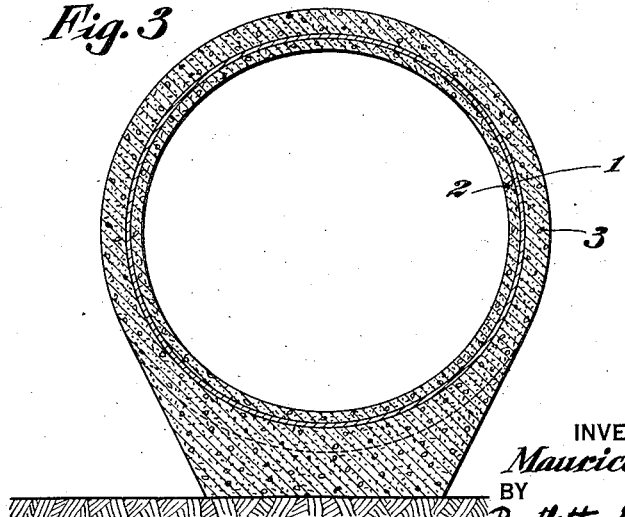
INVENTOR
Maurice M. Ogee,
BY
Bartlett, Eyre, Scott &Keef
ATTORNEYS Patented June 30, 1936

2,045,671

UNITED STATES PATENT OFFICE 2,045,671

PIPE CONSTRUCTION

Maurice M. Ogee, Montreal, Quebec, Canada, assignor to The Bonna Pipe Company of America, Inc., Brooklyn, N. Y., a corporation of Delaware Application January 10, 1934, Serial No. 706,035

3 Claims. (Cl. 138—66)

This invention relates to pipes that are made of concrete or other suitable composition, and has special reference to relatively large and heavy pipes for carrying liquid under pressure, the pipes in some instances being upwards of twelve feet or more in diameter and capable of withstanding pressures as high as five hundred pounds and even higher.

Pipes of this character are usually made circular on the inside to afford maximum carrying capacity and to eliminate bending moments due to internal pressure. In laying these pipes they are usually buried in the ground and covered by a few feet of earth representing a uniform vertical load. The wall structure of the pipes must be designed so that the pipes will effectively withstand this load in addition to the loads imposed by their own weight and by the weight of their liquid contents. In order to take care of the bending moments due to these various loads the wall of the pipe is usually made of a uniform thickness sufficient to take care of the maximum bending moments to be expected under actual service conditions. Since there is a wide variation in the intensity of the bending moments existing in different portions of the pipe wall the present practice of making the entire wall of a uniform thickness to take care of the maximum bending moments is not economical but involves considerable waste of material due to unnecessary wall thickness in the extreme top and in the upper side portions of the pipe where the intensity of the bending moments is relatively low compared with the bottom or lower portion of the pipe.

According to the present invention surplus thickness in different portions of the pipe wall is avoided by varying the wall thickness so that the thickness of any given portion is restricted to substantially the minimum practicable thickness required to take care of the maximum bending moments produced in that particular portion under actual service conditions.

Proceeding now to a more detailed description of the invention reference will be had to the accompanying drawing, in which:

Figure 1 is a sectional view of a pipe constructed according to the invention and representing the preferred embodiment thereof;

Fig. 2 is a sectional view of a pipe of the type of Fig. 1 but having an increased bearing surface; and Fig. 3 is a sectional view of a modified form of pipe embodying the invention.

In Fig. 1 the new pipe comprises the cylindrical core or shell 1, the concrete lining 2 of uniform thickness and concrete outer wall 3 of a thickness which gradually increases from a minimum at the top to a maximum at the single point of support at the bottom. The concrete lining and outer wall may be suitably reinforced if desired as by means of circumferentially and longitudinally disposed rods, not shown. The contour of both the inner and outer surfaces of the pipe are preferably circular but not concentric and the thickness of the pipe wall at the bottom may be about three times that at the top as shown, but this ratio may be varied to meet different conditions. In the usual form of pipe having uniform thickness of wall and supported, as is the pipe of Fig. 1, at a single point, the maximum bending moments due to imposed loads will be approximately in a ratio equal to plus 1 at the extreme top portion of the pipe, −1.3 at each side in the vicinity of the horizostal axis and +3 at the extreme bottom portion of the pipe. In other words, under these conditions the intensity of the bending moments produced in the bottom of a pipe wall of uniform thickness will be approximately three times greater than the intensity of the bending moments produced in the top portion of the wall. These ratios or figures are subject to some variation according to the thickness of the pipe, the density of its wall, the density of the liquid, the height of the earth load and other factors not necessary to mention here. In all cases, however, there is a decided difference in the relative intensity of the maximum bending moments encountered at the three critical points already mentioned, namely, at the extreme top and bottom portions of the pipe wall and at the side in the vicinity of the horizontal axis. By graduating the thickness of the pipe wall, as illustrated in Fig. 1, a saving in the amount of material is obtained by a more efficacious distribution thereof, and the setting up of extra bending moments due to action of internal pressure is avoided because the only effect of the internal pressure will be to put the wall of the pipe under pure tension. Moreover, it has been found that when the desired minimum and maximum thickness of the pipe to take care of the maximum bending moments to be expected under actual service conditions have been determined, the resulting thickness of the walls at any point, when the eccentric circular contours are followed, will be approximately the minimum practicable thickness required to take care of the bending moments produced at such point. The circular inner and outer contours of the concrete walls are particularly desirable also from a manufacturing standpoint because permitting the use of circular inside and outside molds.

Where the pipe is supported on an extended bearing surface, the average intensity of the bending moments encountered throughout different portions of the pipe is reduced. In Fig. 2 a pipe of the type of that of Fig. 1 is illustrated with an extended bearing surface obtained by pouring concrete 4 about the bottom of the pipe while the pipe is resting on the ground. The additional support given by the concrete 4 increases the overall strength of pipe and consequently for the same loads permits of a correspondingly reduced wall thickness as compared with the pipe of Fig. 1.

Preferably, however, where an extended bearing surface is provided the embodiment illustrated in Fig. 3 is employed. In this form of the invention the thickness at the top and sides of the pipe are equal and that at the bottom is substantially greater, preferably from two to four times that at the top or sides. When the thickness selected for the extreme top and bottom portions of a pipe having an extended bearing surface are sufficient to prevent overstressing, the maximum bending moments produced in the side portions of the pipe may be adequately taken care of without excessive waste of material by making the side portions of the same thickness as the top portion. In other words, it has been ascertained that the bending moments at the top and on the sides are almost equal when there is adequate thickness in the bottom portion of the pipe to take care of the bending moments produced in this portion of the pipe under actual service conditions. It will thus be seen that the design of Fig. 3 is economical since it provides an adequate wall thickness at the three critical points where the maximum stresses are encountered.

As will be evident to those skilled in the art, my invention permits various modifications without departing from the spirit thereof or the scope of the appended claims.

Having thus described my invention, what I claim is:

1. A pipe comprising a cylindrical core of steel, a cylindrical lining of concrete within the core and an external coating of concrete about the core having a cylindrical outer surface, the circular contours of the inner and outer surfaces of the pipe being eccentric with the axis of the outer contour below that of the inner contour to provide a substantially thicker wall portion at the bottom of the pipe than at the top or sides.

2. A pipe according to claim 1 wherein the eccentricities of the contours of the inner and outer concrete surfaces of the pipe are such as to make the wall thickness at the bottom about three times that at the top.

3. A pipe comprising a cylindrical core of steel, a cylindrical concrete lining therein and an outer concrete coating thereon, the thickness of the concrete of the outer coating being substantially greater at the bottom of the pipe than at the top of the pipe.

MAURICE M. OGEE.